United States Patent [19]

Arenhold

[11] Patent Number: 4,505,010
[45] Date of Patent: Mar. 19, 1985

[54] SPRING CLIP

[76] Inventor: Knut Arenhold, Westend 7, 2000 Hamburg 52, Fed. Rep. of Germany

[21] Appl. No.: 421,314

[22] Filed: Sep. 22, 1982

[30] Foreign Application Priority Data

Sep. 24, 1981 [DE] Fed. Rep. of Germany ....... 3138445

[51] Int. Cl.³ ............................................. B62D 25/16
[52] U.S. Cl. ......................................... 24/456; 24/535;
24/568; 81/3 R; 269/254 R; 280/154
[58] Field of Search ...................... 24/19, 20 S, 20 LS,
24/67.5, 135 R, 243 B, 252 R, 255 R, 255 BS,
259 R, 263 A, 263 DB, 275, 279, 284, 295, 67 R,
67.1, 67.3, 67.5, 67.7, 456, 486, 502, 513, 514,
524, 525, 535, 538, 568, 569; 269/160, 254 R;
81/3 R, 43; 16/277; 160/402; 280/154, 154.5,
154.5 A, 154 R; 411/172–175, 182

[56] References Cited

U.S. PATENT DOCUMENTS

| 982,541 | 1/1911 | Smith | 24/243 B |
|---|---|---|---|
| 1,070,952 | 8/1913 | Erickson | 24/279 |
| 1,087,670 | 2/1914 | Larson | 24/255 R X |
| 1,135,995 | 4/1915 | Dean | 24/279 |
| 1,256,426 | 2/1918 | Baltzley | 24/456 |
| 1,358,560 | 11/1920 | Kennison | 24/252 R |
| 1,424,907 | 8/1922 | Hulit | 24/67.3 X |
| 1,782,476 | 11/1930 | Parker | 24/20 LS |
| 1,920,899 | 8/1933 | Sullivan | 24/535 |
| 2,062,685 | 12/1936 | Tinnerman | 24/259 R X |
| 2,166,344 | 7/1939 | Donohue | 24/259 R X |
| 2,243,468 | 5/1941 | Johnson | 24/243 B X |
| 2,298,568 | 10/1942 | Kost | 411/175 |
| 2,346,200 | 4/1944 | Tinnerman | 24/535 X |
| 2,398,995 | 4/1946 | Beck | 24/243 B |
| 2,446,141 | 7/1948 | Parsons | 24/259 R X |
| 2,518,563 | 8/1950 | Myers | 24/67.1 X |
| 2,573,913 | 11/1951 | Ki Ku | 24/263 A X |
| 2,861,309 | 11/1958 | Saviolides | 24/259 R X |
| 3,226,763 | 1/1966 | Jonas | 16/252 R |
| 3,446,212 | 5/1969 | Le Roy | 24/456 X |
| 3,946,466 | 3/1976 | Sakai | 24/243 B |
| 3,953,053 | 4/1976 | Arenhold . | |
| 4,323,262 | 4/1982 | Arenhold . | |

FOREIGN PATENT DOCUMENTS

| 1965603 | 3/1967 | Fed. Rep. of Germany . | |
| 14686 | of 1909 | United Kingdom | 24/514 |

Primary Examiner—William E. Lyddane
Assistant Examiner—James R. Brittain
Attorney, Agent, or Firm—Murray, Whisenhunt and Ferguson

[57] ABSTRACT

A spring clip particularly suitable for fixing a mud-flap to a motor vehicle has two legs interconnected by means of a base and is so formed that when relaxed the legs converge towards their free ends. A threaded bore is provided in one of the legs, in which may be threaded a screw to contact the other leg, such that the two legs may be thrust apart on further turning of the screw. The clip may then be fitted over a fender-fold against which a portion of a mud-flap lies, such that the mud-flap is securely held thereby. The leg contacted by the screw-end may have a contact depression formed therein to receive the screw-end, to prevent wandering thereof.

In an alternative embodiment, a separate U-shaped expanding tool is provided, one leg of which may engage one leg of the clip, and the other leg of which has a threaded bore in which a screw can be fitted, such that the screw may engage the other leg of the clip. In this way, the clip may be expanded externally, and hence fitted deeper into engagement with a fender-fold and mud-flap.

6 Claims, 10 Drawing Figures

SPRING CLIP

BACKGROUND OF THE INVENTION (a) Field of the Invention

The invention relates to a spring clip, particularly (but not exclusively) for fixing a mud-flap to a motor vehicle.

(b) Description of the Prior Art

A known spring clip suitable for fixing a mud-flap to the lower in-turned edge of a vehicle body at the rear of a mudguard or fender (which edge is hereinafter referred to as a 'fender-fold') is described in German Utility Model Specification No. 1,965,603, and comprises two legs interconnected by a base region, the free ends of the legs being somewhat bent outwardly so that the clip may be fitted to a fender-fold and the marginal area of a mud-flap adapter protrusion to hold the two together by pressing the clip thereon, thus separating the legs as necessary. Due to the resilience of the clip, the legs press the mudguard flap against the fender-fold, and by providing a plurality of clips to engage the fender-fold and the mud-flap, the latter is to a certain extent held on the former.

However, the holding power obtainable in this way is relatively limited, because such a clip can only be placed over the fender-fold and adjacent mud-flap if the free ends of the legs have no hooks or teeth provided on their inner surfaces, which hooks or teeth could otherwise prevent the clip from sliding out of position or the mud-flap sliding out of the clip. In addition, the resilient restoring force of the legs must not be too high, because otherwise the legs would not expand or separate when attempting to mount the mud-flap on the fender-fold.

In use, it is found the known spring clips constantly become disengaged and lost, so that the holding of the mud-flap becomes impaired. It is therefore now the conventional practice to use rigid U-shaped clips having a clamping screw provided in a threaded hole formed in one leg of the clip and which presses the fender-fold and the engaging fastening area of the adapter protrusion against the other clip leg. In addition, clips as described in German Utility Model Specification No. 1,965,603 have been used, which clips comprise two separate leg elements which can be pressed together with the aid of a nut and bolt, so that they maintain the mud-flap on the fender-fold. Other spring clips are known for example from U.S. Patent Specification No. 3,226,763, but these clips are relatively complicated and moreover have legs which extend substantially parallel to one another; such clips will therefore suffer from the same disadvantages as have been discussed above in connection with the known mud-flap fixing clips.

These known clips for fixing mud-flaps to motor vehicles have the disadvantage of requiring a screw, which either presses the fender-fold and the mudguard flap against the second leg of the clip or presses together the two clip legs. Such a screw projects outwards at least beyond one clip leg and generally in the direction of the wheel which is located in front of the mudguard. In particular, in the case of modern vehicles with relatively small wheel cut-outs and soft suspension, this can lead to the projecting screw end coming into contact with the tire. Generally this difficulty cannot be eliminated by fitting the clip in such a way that the projecting screw end is directed away from the tire, i.e. rearwards. In the case of such an arrangement the screw is accessible only with great difficulty, and frequently the mud-flap can be fitted only by jacking up the vehicle and removing the wheel.

OBJECTS OF THE INVENTION

It is principal object of this invention to provide a spring clip which is able securely and firmly to hold a mud-flap to the fender-fold of a motor vehicle, but which clip does not suffer from the disadvantages discussed above of the prior art clips.

It is a further object of this invention to provide a spring clip which may have teeth, hooks or other barbs at or adjacent the free ends of the clip, so as more securely to hold a mud-flap to a fender-fold of a vehicle.

Yet another object of this invention is to provide a spring clip the legs of which can be separated by a detachable expanding tool, such that a single expanding tool may be used with a large number of clips. This enables the unit cost of each clip to be reduced, and hence a further object is to provide a clip which lends itself to large-scale mass production.

SUMMARY OF THE INVENTION

In accordance with the foregoing and other objects, this invention provides a spring clip suitable for fastening a mud-flap to a motor vehicle, which clip comprises a first leg having a free end, a second leg having a free end, and a base conjoining said first and second legs at their ends remote from said free ends thereof, the clip being resilient and so-formed that in the relaxed state said legs converge towards their said free ends, at least one of said first leg and second leg being provided with an opening through which an expanding tool can be inserted which tool is adapted to act on said two legs to effect relative movement thereof so as to increase the separation of said free ends of the first and second legs.

In accordance with preferred aspects of the invention, the free ends of the legs are turned towards one another and are provided with teeth on those free ends, to enhance the gripping power of the clip.

BRIEF DESCRIPTION OF THE DRAWINGS

In order that this invention may better be understood, it will now be described in greater detail and certain specific and preferred embodiments thereof given by way of example, reference being made as appropriate to the accompanying drawings. In the drawings.

DESCRIPTION OF THE PREFERRED EMBODIMENTS

Figure 2:
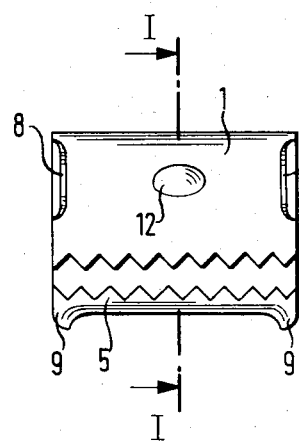
FIG. 2 is a view of the clip of FIG. 1, taken from the right of that Figure.

From the above, it will be appreciated that in the case of a spring clip according to the invention the spreading of the legs is not brought about by thrusting the clip on the material to be clamped (e.g. on the fender-fold and the mud-flap) but the legs are instead relatively separated beforehand by using an expanding tool. Thus, the free ends of the clip legs can be formed in such a way that in the fitted state they engage in claw-like manner with for example the fender-fold and optionally with any undersealing agent deposited thereon, as well as the mud-flap. The free ends of the legs need not be curved outwardly, and there is no need for the inner surfaces of the legs to be smooth. Moreover, the clip can be constructed in such a way that it exerts a very powerful clamping force. In addition, from a relatively small width between the free ends of the clip legs when relaxed, the clip can be expanded to a significant extent by means of the expanding tool, so that it can be placed over materials of different thickness for clamping them together; the clip according to the invention thus has universal use.

In order additionally to secure the material to be clamped such as a mud-flap, there may be provided hooks on at least one leg between the free end thereof and the part engaged by the expanding tool which hooks extend inwardly generally in the direction of the other leg. Such a clip can be used so that in the fitted state said hooks are located on the side of the mud-flap; this enables the hooks to penetrate the rubber material of the flap and therefore secure the latter with a barb-like action.

Clips of this invention are preferably made in one piece from a spring steel material.

According to a preferred embodiment of the invention, one leg can have at least one threaded hole able to receive an expanding tool in the form of a screw whereby the other leg may be contacted by the end of the screw and separation effected by turning the screw, until the free ends of the legs may pass over the material to be clamped, such as the fender-fold and the mud-flap attachment area engaging thereon. When in this fitted position, it is merely necessary to unscrew the screw again, bringing the legs and in particular the free ends thereof as well as any teeth into working engagement. If the expanding tool is constituted by a thumb screw or a screw with a radially extending lever provided on the head, it is possible to fit the clip without using an additional tool for rotating the screw.

As will immediately be apparent, only a single screw is required for fitting several clips according to the invention, whereas in the case of the known U-shaped clips, each clip must be provided with a screw. Thus, a considerable material and cost saving can be achieved with the spring clip according to the invention, which can be mass-produced. Moreover, less material is required to make a clip according to the invention than is the case for the prior art U-shaped clips.

As in general the legs of a spring clip have a relatively small thickness, typically when using spring steel in the range of 0.8 to 1.2 mm, the threaded hole can be formed by a bore through the leg, a radial notch extending from the bore and the marginal region around the bore being bent inwardly of the clip, the extent of the bend reducing steadily around the bore from one side of the notch to the other. In this way, the inwardly bent marginal area forms at least part of a thread with which the screw thread can be engaged.

If the guidance of the screw in the threaded hole is not sufficient to prevent the screw-tilting on being used to expand the clip, by the inner end of the screw moving towards the free end of the leg, a contact region advantageously in the form of a circular depression may be provided in the other leg (i.e. the leg not provided with the threaded hole), which region is generally opposed to the threaded hole. As a result, any tendency of the screw end to be displaced towards the lateral edges or to the free end of the leg having the depression is avoided.

Yet another embodiment of this invention is adapted for use with a two-part expanding tool, the opening providing in the one leg being engageable by one part of the tool and the other leg having an externally accessible contact region for the other part of the tool and the two parts of the tool being movable one relative to the other. The engagement area which is accessible from the outside preferably comprises a portion which is able at least partly to surround one part of the expanding tool, such as a web or bar which is spaced outwardly from the associated leg and between which web or bar and the leg it is possible to insert said other part of the expanding tool.

In the case of such a spring clip, expansion takes place in such a way that the other leg is secured to the other part of the expanding tool, whilst the one leg is drawn away from the leg held by the expanding tool with the aid of the one part of said tool.

In the case of such a clip, although a somewhat more complicated expanding tool is required and which, for example, is U-shaped with one leg thereof adapted to engage said externally-accessible contact area and a screw or lever carried in the other leg thereof for engagement with the opening, there is the advantage that the clip can be mounted on the material to be clamped to such an extent that the material engages the base, because in the area between the two clip legs there are no expanding tool elements, unlike the case for the previously described-expanding tools where an expanding pressure is exerted on the legs.

The engagement area in the leg which is engaged by the movable part of the expanding tool can comprise an opening for receiving a part of said tool. If the opening is to be engaged by an expanding tool part comprising a screw and having at its lower end an annular groove, the opening can have a keyhole-like shape, the long axis of which opening running in the direction in which relative movement between the clip and tool must be effected to achieve engagement between said other part of the tool and said externally accessible contact region. Thus, the expanding tool can initially be placed on the spring clip and then the screw, which optionally may have a winged head, can be screwed in the direction of the associated leg until it extends through the larger part of the keyhole-like opening and the annular groove lies in said opening area above the leg. If there is then a further movement of the expanding tool on to the spring clip, the screw groove enters the narrower area of the keyhole-like opening and on unscrewing the screw the annular shoulder at the lower side of the groove engages the inside of the leg and draws it away from the other leg, which is held in position by the expanding tool. It is pointed out that depending upon the clip configuration, the mounting of the expanding tool can take place from the rear—i.e. from the base—or instead from the side.

To prevent the end portion of the screw having the annular groove from wedging on the material to be clamped on lowering the one leg to engage the material, the leg area having the opening can be displaced outwardly from said leg. In this way, the end portion of the screw having the annular groove can be moved out of the keyhole-like opening without difficulty even when the clip is in the clamped state, to permit complete removal of the expanding tool.

To give the clip legs adequate strength, at least portions of the lateral edges thereof can be bent outwards.

In order that when in the fitted state the clip does not bend inwardly in the vicinity of the base, the latter is conventionally curved outwardly, and may have a substantially constant radius of curvature. However, if the clip base is to be placed on the surface of a mud-flap in order to permit the fixing thereof to a vehicle not having a fender-fold as such, as described in DE-AS No. 23 52 472, the regions of the base adjoining the legs may have a relatively small radius of curvature, and the major part of the base may then have a substantially greater radius of curvature with a hole provided centrally therein. The central region of the base will then have an almost planar surface.

In order when using the clip for fixing a mud-flap to the fender-fold of a motor vehicle to position the clip as far as possible from the wheel area, one clip leg but optionally both legs can be bent, in the manner described in DE-OS No. 29 05 753.

The especially-preferred embodiments of spring clip illustrated in the drawings will now be described in detail, initially by referring to FIGS. 1 to 3. The clip there shown is made in one piece from strip spring steel and has a first leg 1 and a second leg 2, connected by means of a curved base having a substantially constant radius of curvature.

Figure 1:
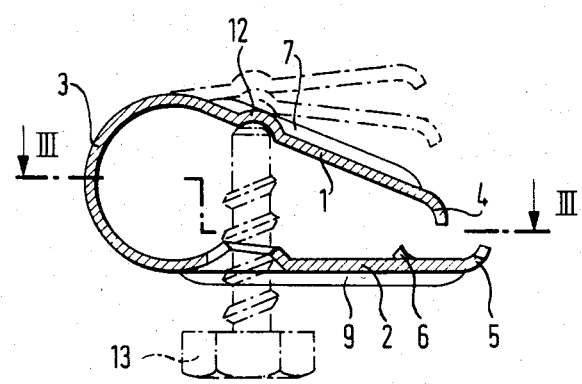
FIG. 1 is a cross-section through a spring clip of this invention, a screw serving as the expanding tool and indicated in broken lines, the section line being marked as I—I on FIG. 2.

The free end 4 of leg 1 and the free end 5 of leg 2 are bent inwards and provided with teeth as is shown particularly in FIG. 1. In addition, leg 2 has upturned hooks 6, each of which is formed by two notches. A hole 10 is provided in leg 2 in the central plane of the clip, spaced from the hooks and closer to the base 3, and in the marginal area thereof extends a notch 11. Starting from one side of the notch, the marginal area is bent inwards (FIG. 1) in such a way that the degree of inward bending is greatest at the notch and then continuously decreases. Thus, the marginal area of hole 2 has a screw-like profile corresponding to that of screw 13 (in FIG. 1) and consequently said screw can be screwed into the hole 10.

Opposite to the bore 10 there is formed a depression 12 in leg 1 and in this the end of screw 13 engages on leg 1. Thus, when the screw 13 is screwed into hole 10 so as to exert pressure on leg 1, the end thereof moves into the raised position shown in broken lines in FIG. 1, the screw end remaining in the depression 12. In this way, the depression 12 serves to guide and align the screw 13.

Parts 7 and 8 of leg 1 and part 9 of leg 2 are bent outwards (i.e. upwards and downwards respectively in FIG. 1) so as to give the legs additional rigidity, whereby even an opening the clip there is no deformation of the legs. Instead, the entire elastic deformation takes place substantially in the area of base 3 and the transition areas from the latter to legs 1 and 2.

The described spring clip can be used to fix a mud-flap to the fender-fold of a motor vehicle. The flap is engaged in a known manner with the inner marginal area of its adapter protrusion on the fender-fold, and by screwing in screw 13 the clip is opened in such a way that the free ends 4 and 5 of the legs 1 and 2 respectively can be moved over the fender-fold and the mudguard flap. Generally, the clip would be aligned in such a way that the free end 4 of leg 1 engages behind the fender-fold, whereas the free end 5 of leg 2, as well as hooks 6 engage on the outer face of the fastening area of the mud-flap. Therefore leg 2 is made somewhat longer than leg 1, because in the vicinity of the mud-flap a larger contact area is available than there is at the fender-fold. After placing the clip over the fender-fold and the mud-flap, screw 13 is unscrewed again and the flap is secured to the fold by the clamping action of legs 1 and 2. As soon as the legs are supported on the flap and fold the screw can be unscrewed, with substantially no resistance. Obviously, in general two or more such clips would be used and it has been found that with clips of sufficient resilience and strength, two or three such clips are sufficient to hold the mud-flap undetachably and immovably on the fender-fold, without additional fastening devices.

Since after the fitting of the spring clip the screw is removed, so that fastening is effected solely by the screw-less clips, in the as-fitted state of the mud-flap there is no projection in the direction of the tire and consequently no risk of damage to the tire in the case of pronounced suspension travel.

Figure 4:
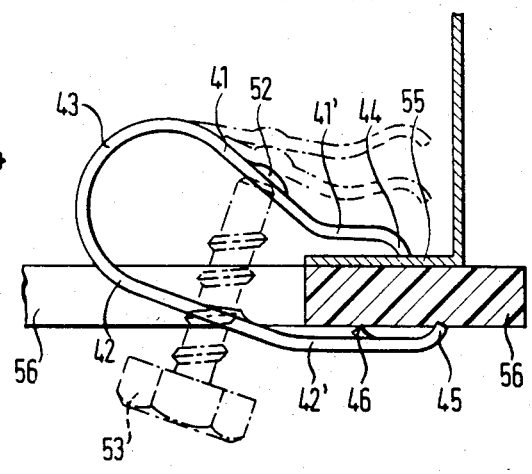
FIG. 4 shows another clip for fixing a mud-flap to the fender-fold, as fitted.

FIG. 4 diagrammatically shows the fixing of a mud-flap 56 to a fender-fold 55. As is conventionally the case, the flap comprises a main flap body and an adapter protrusion extending upwards therefrom (c.f. German Patent No. 23 42 365 and DE-OS No. 28 51 784), the inner marginal area of the adapter protrusion engaging and being fixed to the fender-fold.

Figure 3:
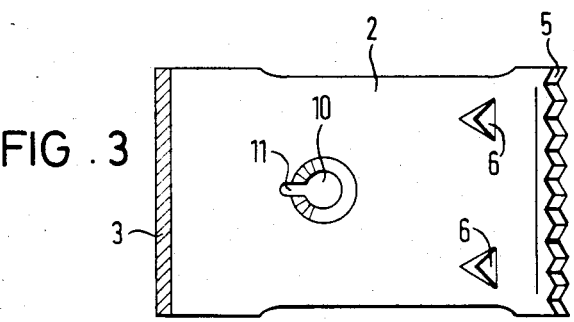
FIG. 3 is a cross-section taken along line III—III marked on FIG. 1.

For fixing a mud-flap 56 to fender-fold 55, as shown in FIG. 4, a clip is used, the construction of which substantially coincides with the clip of FIGS. 1 to 3. However, the clip shown in FIG. 4 differs from the latter clip in that legs 41 and 42 connected by base 43 are bent somewhat; specifically, area 42' of leg 42 between the free end 45 of the leg and the threaded hole for the screw 53 is displaced in the direction of leg 41 about a bend line which is adjacent and preferably directly adjacent the threaded hole. Similarly, portion 41' of leg 41 is displaced in the same direction along a bend line located between the free end 44 and a depression 52, preferably in the immediate vicinity of the latter. As a result of these bends, the rear part of the clip having the base 43 extends upwards, as shown in FIG. 4. As the fender-fold 55 carrying the mud-flap 56 is positioned behind the wheel on the vehicle, the rear part of the clip also extends away from the wheel, so that there is no risk of contact between the wheel and clip in the case of pronounced deflection of the vehicle suspension.

It is pointed out that the other previously-described spring clips may obviously be used for fixing a mud-flap to the fender-fold in the manner shown in FIG. 4 and that in most cases there will be no problems concerning contact with the tire because the clip has no screw projecting therefrom.

Figure 6:
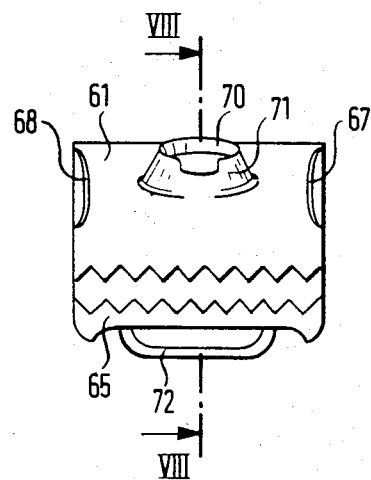
FIG. 6 is a view of the clip of FIG. 5, taken from the right of that Figure.
Figure 5:
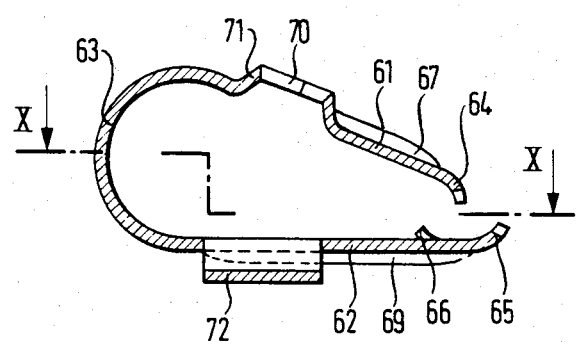
FIG. 5 is a cross-section through another embodiment of the spring clip of this invention, the section line being marked as VIII—VIII on FIG. 6.
Figure 7:
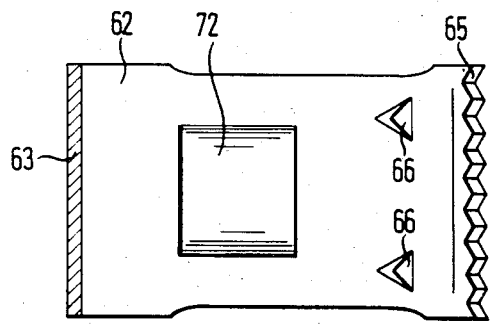
FIG. 7 is a cross-section taken along line X—X marked on FIG. 5.

The spring clip shown in FIGS. 5 to 7 has legs 61 and 62 which are interconnected by means of a base 63 having a relatively large radius of curvature. The free ends 64, 65 of the legs 61, 62 are toothed and curved inwards, i.e. arranged in a similar manner to the embodiment of FIGS. 1 to 3. Also similarly to the embodiment of FIGS. 1 to 3 the lateral edges 67, 68 and 69 of legs 61 and 62 are partly bent over outwardly in order to give the legs adequate rigidity, and leg 62 has hooks 66 formed by pressing inwardly notches in the leg, the hooks being directed towards leg 61 and base 63. The hooks thus serve as barbs when in the clamped state.

A web 72 is formed in leg 62 by providing notches running at right angles to the longitudinal extent of the leg and then bending outwardly the area between the notches. Leg 61 has a keyhole-shaped opening 70, the longitudinal axis of which runs in the direction of the longitudinal extent of leg 61 and the narrower area of which is closer to the free end 64 than to the wider area. The area surrounding the keyhole-shaped opening is forced outwardly from the leg, so that a transition surface 71 extending from leg 61 to the opening 70 is formed.

Figure 8:
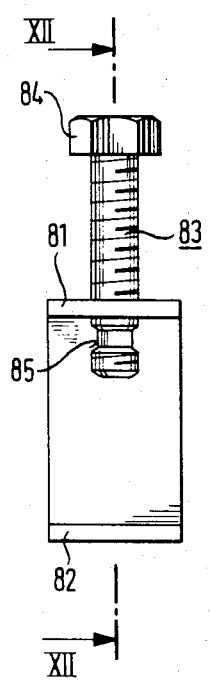
FIG. 8 shows an expanding tool for a clip according to FIGS. 5 to 7.
Figure 9:
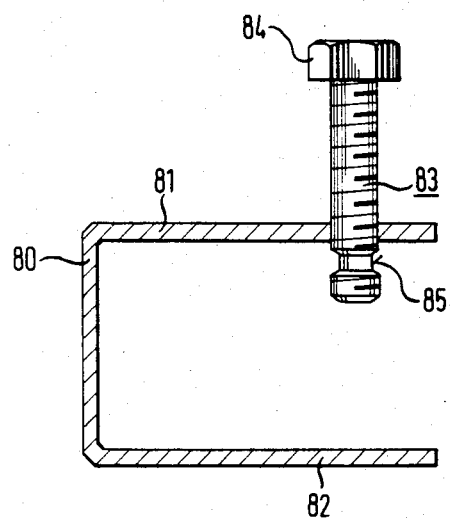
FIG. 9 is a cross-section taken along line XII—XII marked on FIG. 8.

In order to be able to open up or spread apart the clip according to FIGS. 5 to 7 an expanding tool is used which applies tension to legs 62 and 61. An embodiment of such a tool is shown in FIGS. 8 and 9. This tool essentially comprises a U-shaped member with a base 80 and legs 81 and 82 joined to the base 80, as well as a screw 83 having a head 84 which screw is threaded into a threaded bore in leg 81. Screw 83 has adjacent its lower end an annular groove 85, whilst the region between the groove 85 and the free end of screw 83 carries the normal screw thread. In order to prevent difficulties on entering the screw 83 in the threaded bore, the axial width of the groove is preferably greater than the thickness of the material of leg 81, so that the thread portion located between the free end of the screw 83 and the groove 85 may come free of the threaded bore in leg 81 before the threaded portion of the screw 83 located between the groove 85 and the head 84 engages with the threaded bore in leg 81.

Figure 10:
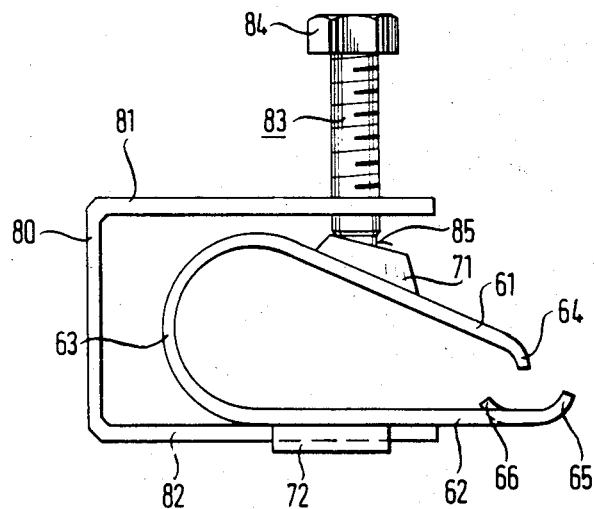
FIG. 10 shows diagrammatically the clip according to FIGS. 5 to 7 as inserted in the expanding tool according to FIGS. 8 and 9.

The leg 82 of the above-described expanding tool can be introduced into the region between leg 62 and web 72, from the direction of the base 63 of the clip, provided that the screw 83 is withdrawn from the threaded hole in leg 81 to such an extent that it does not impede the mounting of the U-shaped body on the clip. When the clip is in such a position that the free end of the screw 83 is located directly above the wider part of the keyhole-shaped opening 70, screw 83 is screwed further into the threaded hole in leg 81 until circular groove 85 is in the vicinity of opening 70. In this position the expanding tool is moved still further on to the spring clip and the groove 85 of screw 83 passes into the narrow portion of the keyhole-shaped opening 70. If the screw is then screwed further out of the threaded bore in leg 81, then the annular shoulder of the screw 83 forming the lower boundary of circular groove 85 will engage the underside of the marginal area bounding the narrow portion of the opening 70. Further rotation of the screw draws leg 61 upwards as shown in FIG. 10, whereas leg 62 is held by the engagement of leg 82 with the U-shaped body; i.e. the clip is expanded by the tensile force exerted by screw 83 on leg 61.

On the opening area reaching a size which is adequate for placing the free ends 64 and 65 of the spring clip legs over the material to be clamped, the mounting can take place without removing the clip from the expanding tool. As can be gathered from FIG. 10, the clip can be pushed on to the material to be clamped until that material engages on base 63 because there are no expanding tool parts between the clip legs 61 and 62. If the clip is to be used for example for fixing a mud-flap to the fender-fold of a motor vehicle, fitting essentially takes place in the manner shown in FIG. 4. However, as the clip can be used with its base engaging the mud-flap and the fender-fold, overall a much smaller leg length as required, leading to a definite material saving.

On reaching the desired position of the clip, the screw 83 is screwed further into the threaded bore in leg 81 until legs 61 and 62 engage in a clamping manner on the material to be held. Following a further slight turning of the screw 83 in this position, the screw together with the U-shaped body can be displaced further to the left (in FIG. 10) until the screw enters the wider portion of opening 70. Since the bent-out transition region 71 of the opening 70 is located outside the plane of leg 61, this displacement movement of screw 83 with respect to leg 61 is not inhibited by contact between the free end of the screw 83 and the secured material. After reaching the aforementioned position, the screw can be completely removed from opening 70 by further unscrewing from the threaded bore in leg 81, and then leg 82 of the U-shaped body can be removed from web 72. The expanding tool is thereafter available for fixing a further clip.

It is pointed out that web 72 obviously need not be continuous over the leg 62 and it may well be sufficient to provide only two projections extending towards one another and in the direction of the central axis of leg 62, which projections engage the outside of leg 82 of the U-shaped body of the expanding tool. In the same way, in place of an opening 70 in leg 61, it would be possible to provide on the outer face thereof two approximately parallel ribs with bent upper edges directed towards one another, so that the annular groove 85 of the screw 83 can be moved into the area of said upper edges, with the annular shoulder at the lower edge of the annular groove 85 engaging on the underside of said bent areas. A widening tensile force on leg 61 can thus still be transferred from the screw in the manner described hereinbefore.

What I claim is:

1. A spring clip suitable for fastening a mud-flap to a motor vehicle, which clip comprises a first leg having a free end, a second leg having a free end, and a base conjoining said first and second legs at their ends remote from said free ends thereof, the clip being resilient and so-formed that in the relaxed state said legs converge towards one another at their said free ends, wherein an opening is provided in the first leg and said opening has externally accessible means for receiving and engaging one part of a two-part expanding tool, the second leg having an externally accessible contact region for the other part of the two-part expanding tool, said externally accessible contact region comprising a bar spaced outwardly of said second leg, between which bar and leg said other part of the expanding tool can be inserted and at least partially enclosed thereby, and the two parts of said tool being movable one relative to the other.

2. A spring clip according to claim 1, in which the opening provided in said first leg is of key-hole shape, the long axis of which opening runs in the direction in which relative movement between the clip and tool must be effected to achieve engagement between said other part of the tool and said externally accessible contact region, said one part of the expanding tool comprising a screw having an annular groove at one end thereof which groove is engageable with the key-hole opening in said first leg.

3. A spring clip according to claim 1, in which the region of said first leg in which is formed the opening is displaced outwardly.

4. A spring clip according to claim 1, in which one of the first and second legs has hooks formed therein between the free end of the leg and the base, which hooks extend inwardly in the direction of the base and the other of the first and second legs.

5. A spring clip according to claim 1, and adapted for the attachment of a mud-flap to the fender-fold of a motor vehicle, in which the area of one of the first and second legs lying between the free end and the contact region thereof is bent towards the other of the first and second legs.

6. A spring clip according to claim 5, in which the area of the other of the first and second legs lying opposite to the bent-down area of said one leg is also bent in the same direction.

* * * * *